A. R. GARVER & H. HEMENWAY.
Wire-Stretcher.

No. 222,689.  Patented Dec. 16, 1879.

WITNESSES:
C. Neveux
C. Sedgwick

INVENTOR:
A. R. Garver
H. Hemenway
BY Munn & Co
ATTORNEYS.

UNITED STATES PATENT OFFICE.

ALFRED R. GARVER AND HANEY HEMENWAY, OF COLORADO SPRINGS, COLORADO.

IMPROVEMENT IN WIRE-STRETCHERS.

Specification forming part of Letters Patent No. 222,689, dated December 16, 1879; application filed May 6, 1879.

*To all whom it may concern:*

Be it known that we, ALFRED R. GARVER and HANEY HEMENWAY, of Colorado Springs, in the county of El Paso and State of Colorado, have invented a new and Improved Wire-Stretcher, of which the following is a specification.

The invention consists in combining a spring having a pawl and a T-lever with the ratchet on spool, and in combining with a frame having a slot at one end and a median spool a ribbon of metal and a head, to connect the spool and gripers, as hereinafter described.

Figure 1:
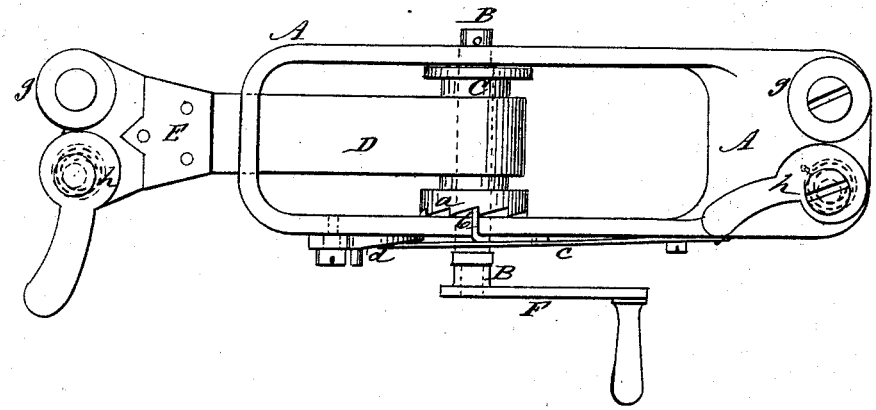
Figure 2:
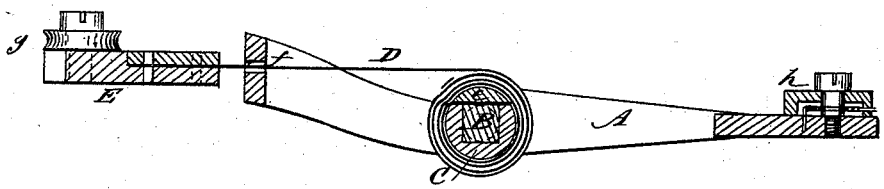
Figure 3:
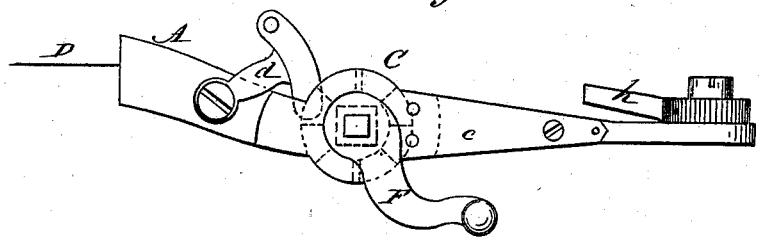
Figure 4:
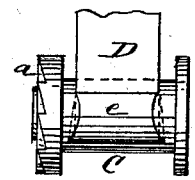

In the accompanying drawings, Figure 1 is a top plan of the improvement. Fig. 2 is a longitudinal section of the same. Fig. 3 is a side elevation of the same. Fig. 4 represents the spool.

Similar letters of reference indicate corresponding parts.

Referring to the drawings, A represents the frame of the stretcher, having a shaft, B, journaled in it, carrying a spool, C, between the side bars of the frame. One end of the spool is provided with ratchet-teeth $a$, engaged by a pawl, $b$, projecting from the spring $c$, attached to the outside of the side bar and working over the shaft B. A T-lever, $d$, pivoted at one end to the side bar, has its free end in position to be pushed between the side bar and the spring, and thus draw the pawls away from the ratchet.

A slightly wedge-shaped segment, $e$, is cut out of the barrel of the spool, so as to form a slot in the barrel. The ends of the segment and those of the slot are correspondingly beveled, so as to form a dovetailed joint.

A metal ribbon, D, has its outer end attached to a head, E, while its opposite end is passed through a slot, $f$, in the end of the frame, and thence to the spool, where its end is clasped between the segment $e$ and the barrel of the spool, as shown in Fig. 2, and is thus securely held, as the segment can be wedged tightly in the slot.

On the head E and the opposite end of the frame are gripers composed of grooved rollers $g$ and spring-cams $h$, with serrated faces and levers for operating them. The spool and shaft are turned by a crank, F.

The operation of the stretcher is as follows: The ends of two sections are caught by the gripers at each end, the ribbon D being unwound from the spool and drawn out to enable the gripers on the head E to reach to the end of the wire at that end. The lever $d$ is now drawn up so as to let the pawl $b$ engage the ratchet. The crank is now turned, winding the metal ribbon D on the spool, thus drawing the wire toward the implement and stretching it. The pawl and ratchet of course prevent any back action until the wire is tied.

Having thus described our invention, we claim as new and desire to secure by Letters Patent—

The combination, in a wire-stretcher, of the spring $c$, having pawl $b$, and the T-lever $d$, with a spool having ratchet $a$, as and for the purpose described.

ALFRED REYNOLDS GARVER.
HANEY HEMENWAY.

Witnesses:
FRANK HEMENWAY,
ADNEY HEMENWAY.